United States Patent [19]

Webster et al.

[11] Patent Number: 5,311,123

[45] Date of Patent: May 10, 1994

[54] METHOD OF MEASURING THE INSTANTANEOUS SHAFT VELOCITY OF A ROTARY MACHINE

[75] Inventors: Gary D. Webster, Ottawa; Stuart Neill, Orleans; Rick Wintjes, Kanata; L. Phillip Carr, Ottawa; Jagdish Patel, Ottawa; Jim Ehrismann, Ottawa, all of Canada

[73] Assignee: National Research Council of Canada/Conseil National de Recherches du Canada, Ottawa, Canada

[21] Appl. No.: 877,417

[22] Filed: May 1, 1992

[30] Foreign Application Priority Data

May 2, 1991 [CA] Canada .................................. 2041731

[51] Int. Cl.⁵ ................................................ G01P 3/56
[52] U.S. Cl. .................................................... 324/161
[58] Field of Search ...................... 73/116, 117.3, 510; 324/161, 166, 173, 174, 178, 179, 161; 364/431.07, 565

[56] References Cited

U.S. PATENT DOCUMENTS

| | | | |
|---|---|---|---|
| 4,506,339 | 3/1985 | Kuhnlein | 364/565 |
| 4,745,363 | 5/1988 | Carr et al. | 324/174 |
| 4,748,565 | 5/1988 | Toya | 324/161 |
| 5,117,681 | 6/1992 | Dosdall et al. | 73/116 |

*Primary Examiner*—Robert Raevis
*Attorney, Agent, or Firm*—Marks & Clerk

[57] ABSTRACT

A method of measuring the instantaneous shaft velocity of a rotary machine having a shaft with a plurality of circumferentially spaced markers thereon, comprises the steps of sensing the passage of the markers with at least two circumferentially spaced sensors mounted adjacent the shaft to generate pulses in response to the passage of the markers; for each of the sensors continually deriving from the pulses and estimated spacing signals representing an estimated spacing of the markers, a set of angular velocity signals representing the instantaneous shaft angular velocity at a given point in time $t_i$; and varying the estimated spacing signals on an iterative basis to attempt to match the sets of angular velocity signals derived from the respective sensors. The described method allows a more accurate ICAV (Instantaneous Crankshaft Angular Velocity) waveform to be produced than was possible using prior art techniques.

10 Claims, 9 Drawing Sheets

METHOD OF MEASURING THE INSTANTANEOUS SHAFT VELOCITY OF A ROTARY MACHINE

This invention relates to a method and apparatus for measuring the instantaneous shaft velocity of a rotary or reciprocating machine.

The detection and diagnosis of power imbalances in, for example, reciprocating engines is an important tool in the optimization of engine performance. The information obtained can be used for such purposes as identifying engine faults, scheduling maintenance, optimizing the combustion process by adjusting engine parameters, and generating emergency shutdowns when potentially dangerous conditions arise.

A number of possible techniques are available for ongoing monitoring of the health or condition of an engine while in operation. One promising technique is known as ICAV, which stands for Instantaneous Crankshaft Angular Velocity measurement. The ICAV technique involves the analysis of minute crankshaft angular velocity variations in a diesel engine to detect cylinder-to-cylinder power imbalances.

One convenient way of deriving ICAV waveforms is to measure the time between the passage of the fly wheel ring gear teeth past a sensor, such as, for example, a Hall effect sensor. The Hall effect sensor produces an output pulse, which can be suitably shaped for further processing, on the passage of each gear tooth.

U.S. Pat. No. 4,179,922 to Harris Corporation discloses an apparatus for determining engine malfunctions from the successive time intervals taken by the gear teeth to pass the sensors. U.S. Pat. Nos. 4,055,998, issued Nov. 1, 1977; 4,055,993, issued Nov. 1, 1977; 4,016,753, issued Apr. 12, 1977; 4,015,467, issued Apr. 5, 1977, all assigned to United Technologies Corporation, describe systems whereby the pulse intervals corresponding to the time between the passage of teeth past the sensor, are used to derive information about engine performance.

A fundamental problem with all these systems, however, is that for useful information to be obtained about engine performance, the instantaneous shaft velocity must be known to a high degree of precision. The above-referenced patents assume that the gear tooth spacing is constant around the circumference of the fly wheel. In actual practice the gear tooth spacing can vary significantly both in the circumferential and axial directions. If the fly wheel is slightly distorted, the spacing detected by the sensor will vary as the fly wheel rotates. Chipped teeth can also cause inaccuracies in pulse spacing since the leading and trailing edges of the pulses can occur at different instances.

Inaccuracies in angular velocity measurement due to the above factors significantly diminish the value of the ICAV waveforms for diagnostic or prognostic purposes. Such inaccuracies have led researchers to investigate other techniques for monitoring engine performance or condition.

An object of the present invention is to provide an improved technique for monitoring engine performance.

According to the present invention there is provided a method of measuring the instantaneous shaft velocity of a rotary machine having a shaft with a plurality of means thereon defining circumferentially spaced markers, comprising: sensing the passage of said markers with at least two circumferentially spaced sensors mounted adjacent the shaft to generate pulses in response to the passage of said marker means thereby; for each of said sensors, continually deriving a signal representing a set of angular velocity values corresponding to the instantaneous shaft angular velocity at a given point in time $t_i$ from said pulses and a signal representing estimated spacings of said marker means; and varying the signal representing the estimated spacings of said marker means on an iterative basis to attempt to match the angular velocity signal derived from the respective sensors.

The marker means are normally gear teeth on the fly wheel, although other forms of markers can be provided. The angular velocity signals are derived on an iterative basis. Initially the spacing is calculated from the known circumference of the fly wheel, the tooth width and the number of gear teeth. Because of the non-uniformity of gear tooth spacing, the two sensors will give slightly different results for the instantaneous angular velocity. Since the angular velocity as measured by the two sensors at the same time point in time must be the same, the assumptions about the spacing of the gear teeth that have passed the two sensors can be changed so as to tend to match the angular velocity signals. This process is carried out during operation of the rotary machine on an iterative basis. Once the gear tooth spacings have been ascertained, these values can be used as a basis for producing an ICAV waveform until recalibration of the equipment is deemed necessary.

The rotary machine will normally be a reciprocating engine, such as a heavy duty diesel engine as might be mounted in a railway locomotive, ship or generating plant, or other mobile equipment powered with heavy duty diesels.

The invention also provides an apparatus for measuring the instantaneous shaft velocity of a rotary machine having a shaft with plurality means thereon defining circumferentially spaced markers, comprising: at least two circumferentially spaced sensors for mounting adjacent the shaft to sense the passage of said markers to generate pulses; for each of said sensors, processor means for continually deriving a signal representing a set of angular velocity values corresponding to the instantaneous shaft angular velocity at a given point in time $t_i$ from said pulses and a signal representing the estimated marker spacings, a set of angular velocity signals representing the instantaneous shaft angular velocity at a given point in time $t_i$; and means for varying the signal representing the estimated marker spacings to attempt to match the angular velocity signals derived from the respective sensors.

In the apparatus, the sensors are conveniently Hall-effect sensors (other types of sensor can also be employed) responsive to the passage of gear teeth to generate a train of output pulses, which can be suitably shaped into a square wave.

The invention will now be described in more detail, by way of example only, with reference to the accompanying drawings, in which.

Figure 5A:
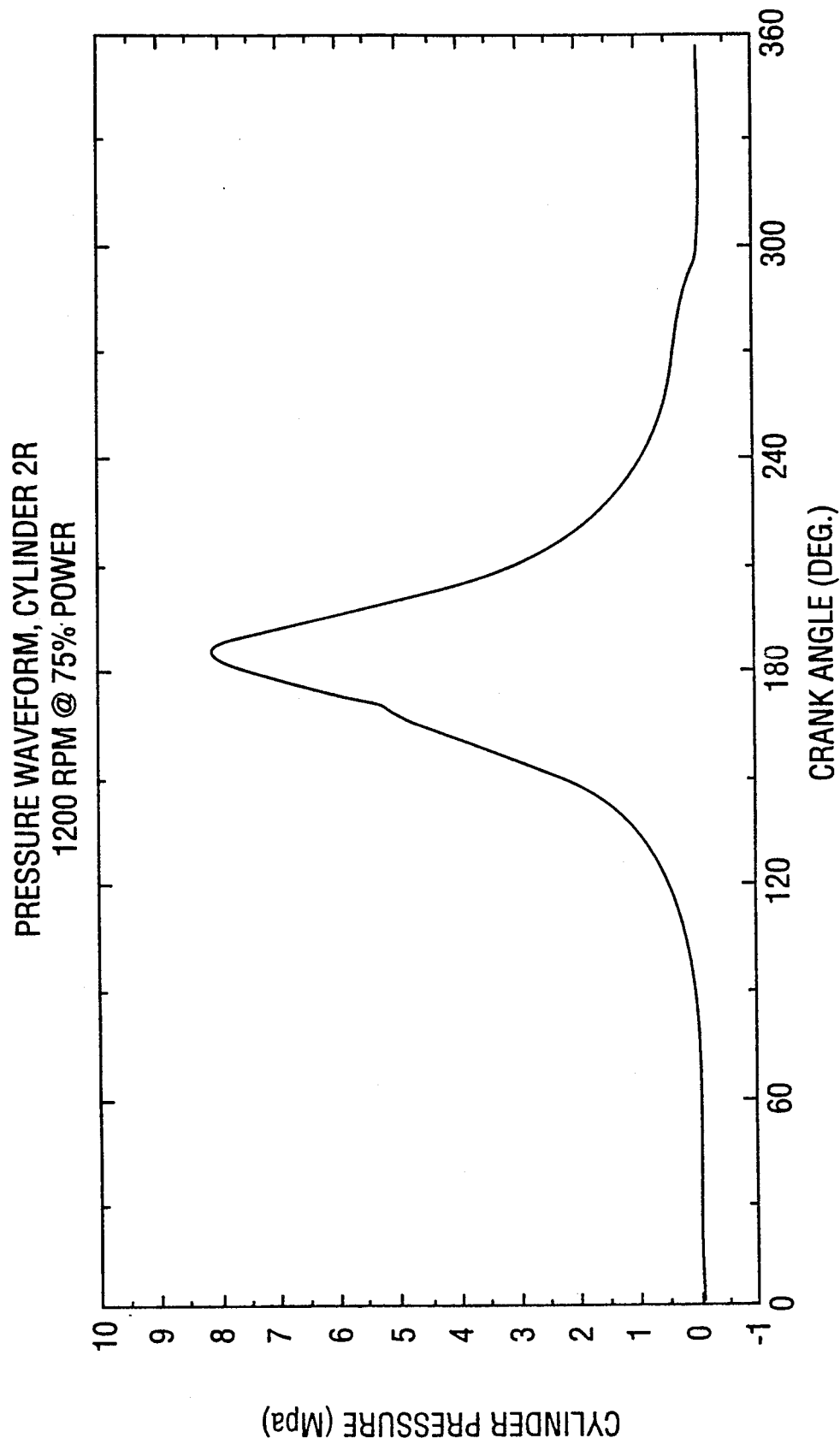
Figure 5B:
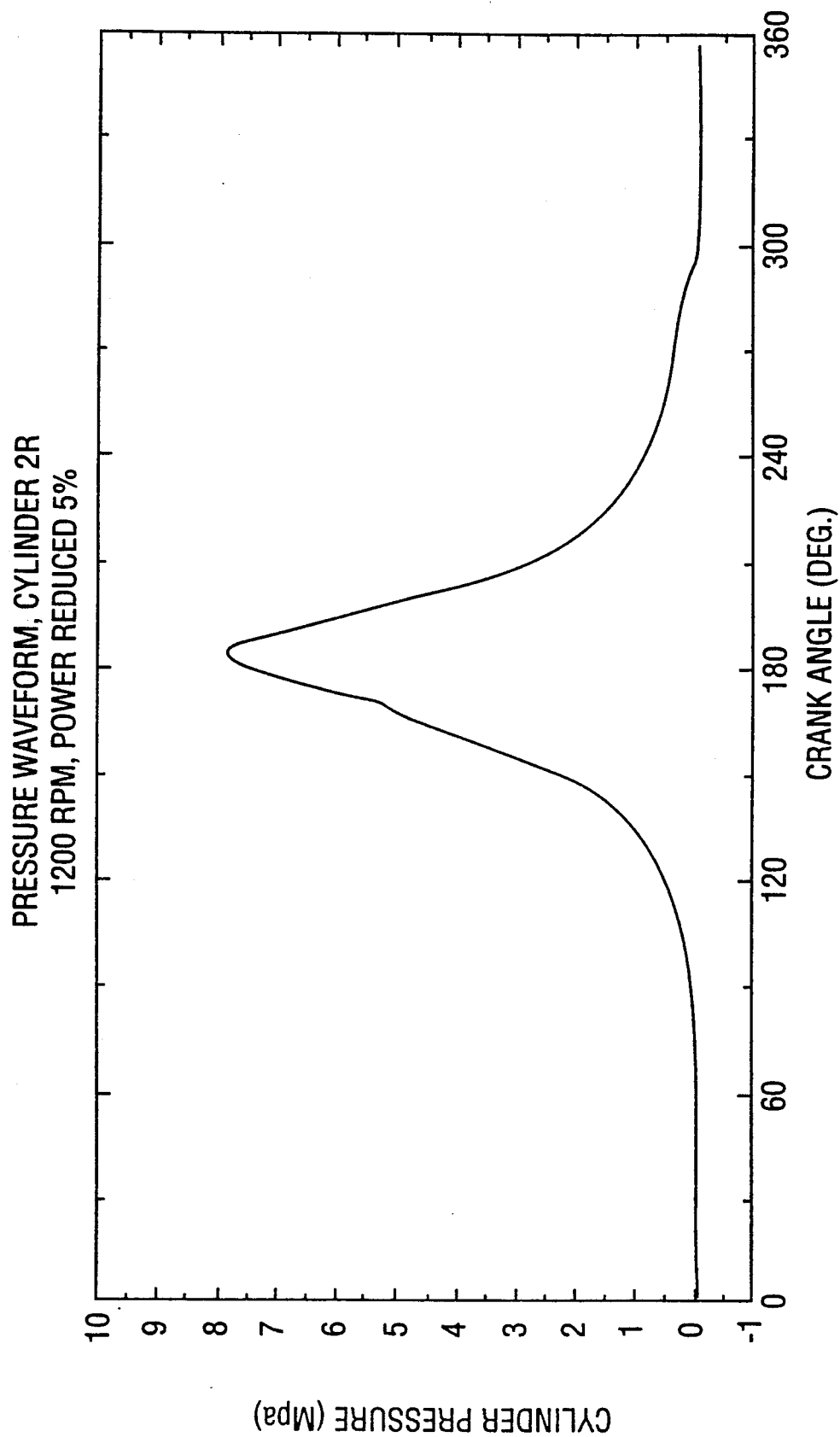
Figure 5C:
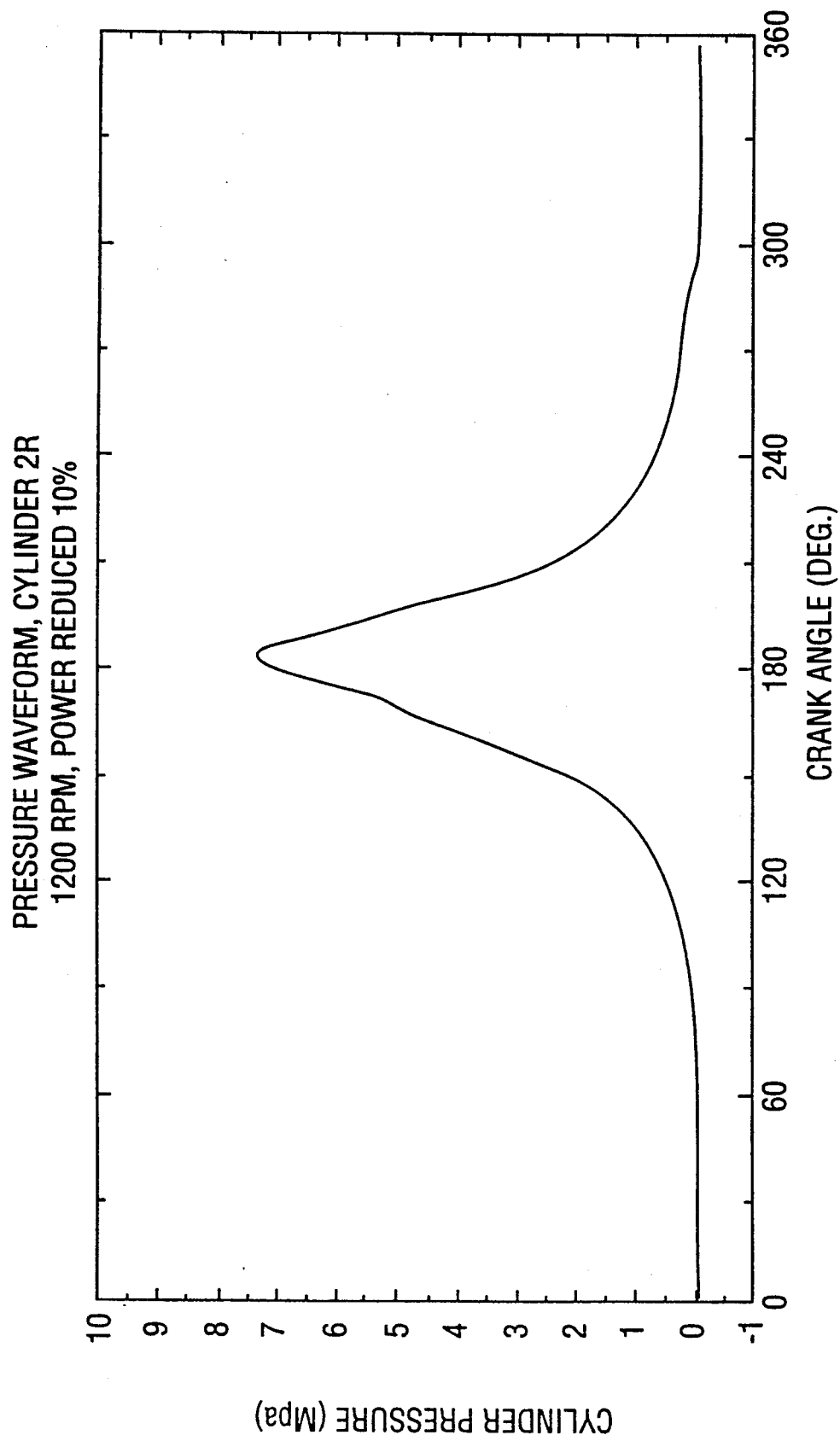
Figure 6A:
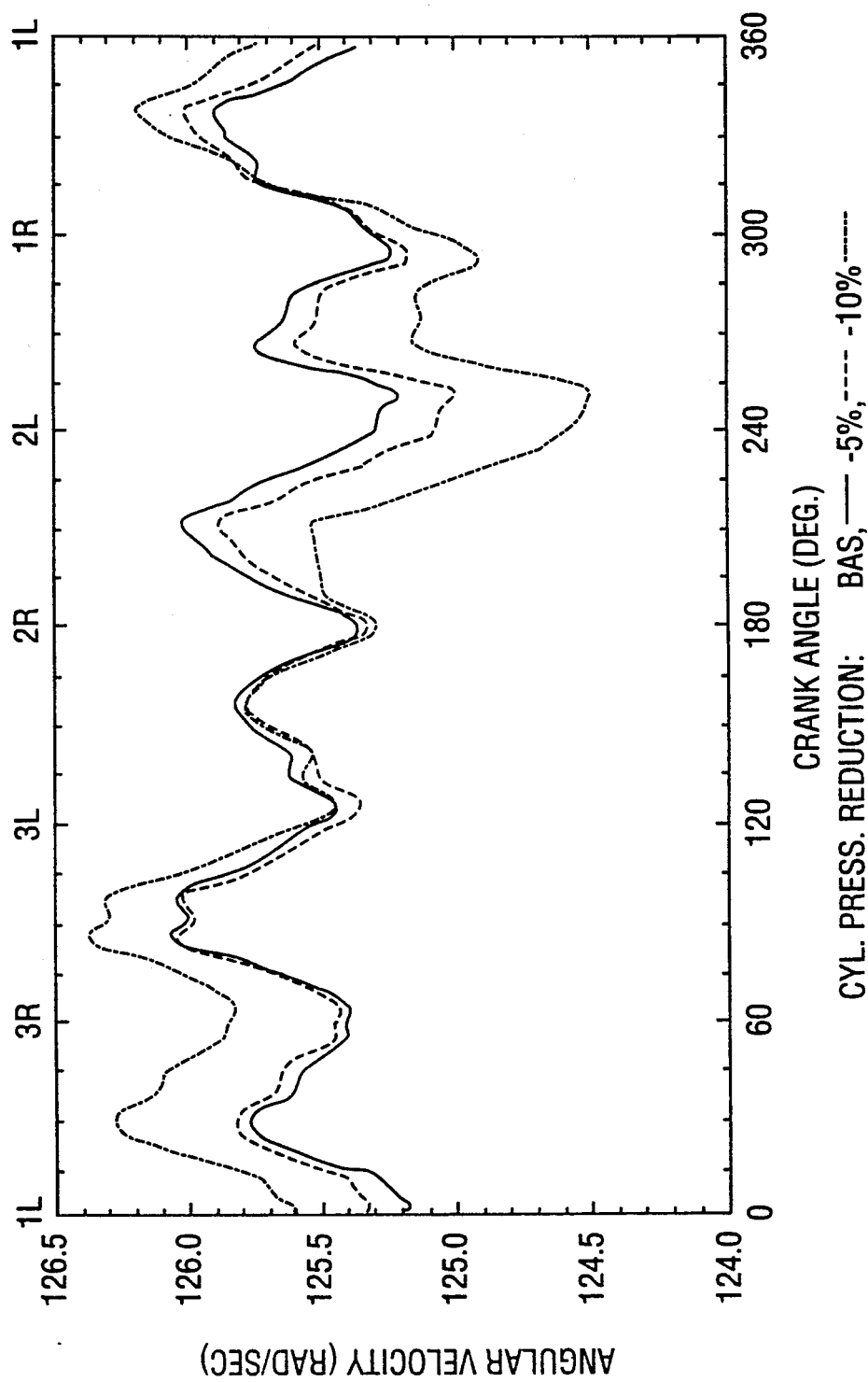
Figure 6B:
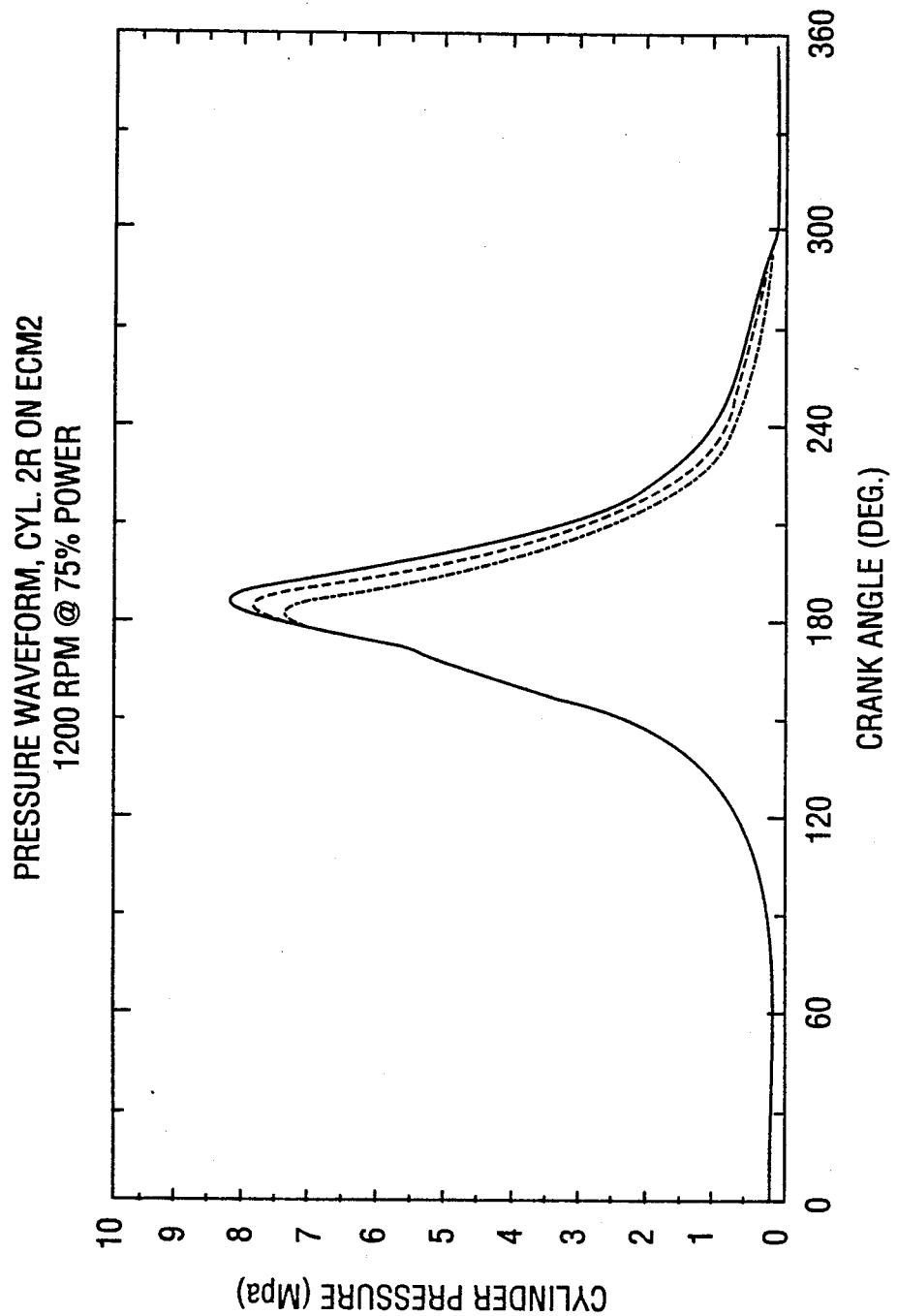
Figure 6C:
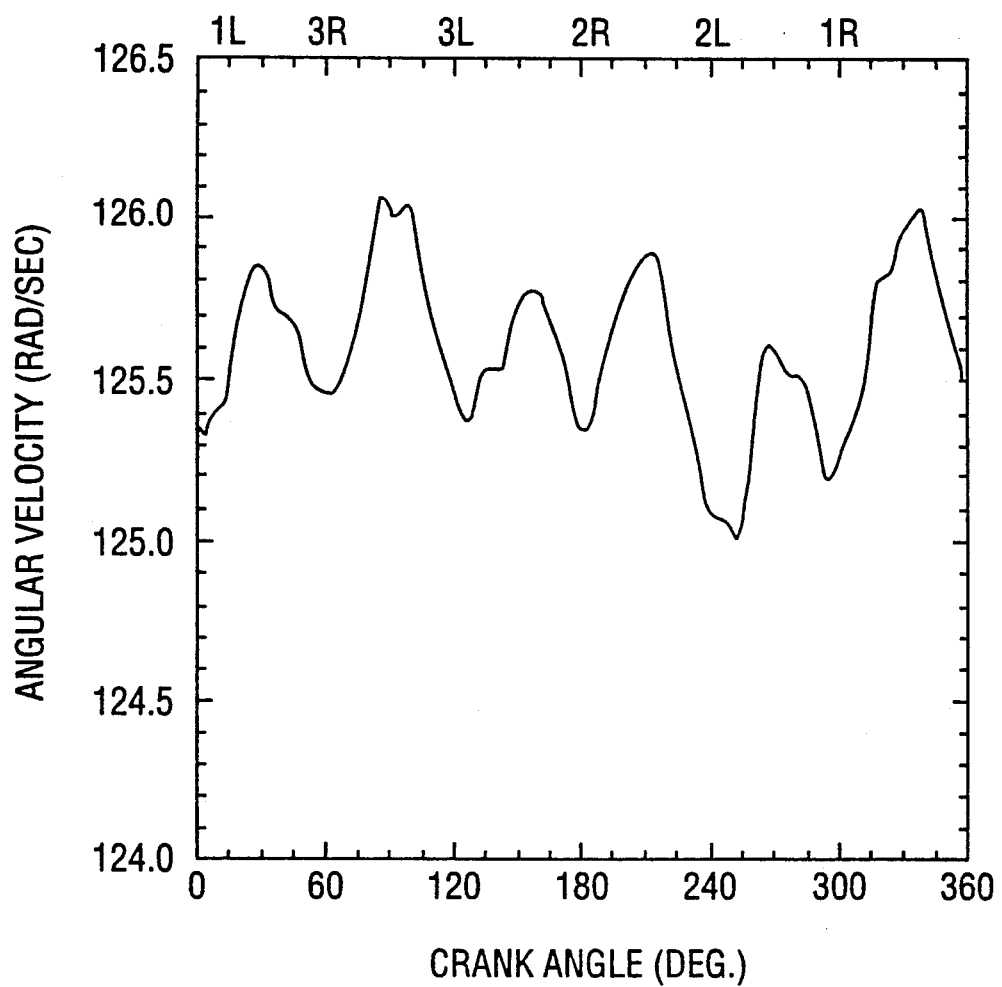

FIGS. 5a and 5b and 5c show ICAV waveforms produced by an apparatus in accordance with the invention; and FIGS. 6a, 6b and 6c show ICAV and pressure waveforms respectively for an engine cylinder at different power levels.

Figure 1:
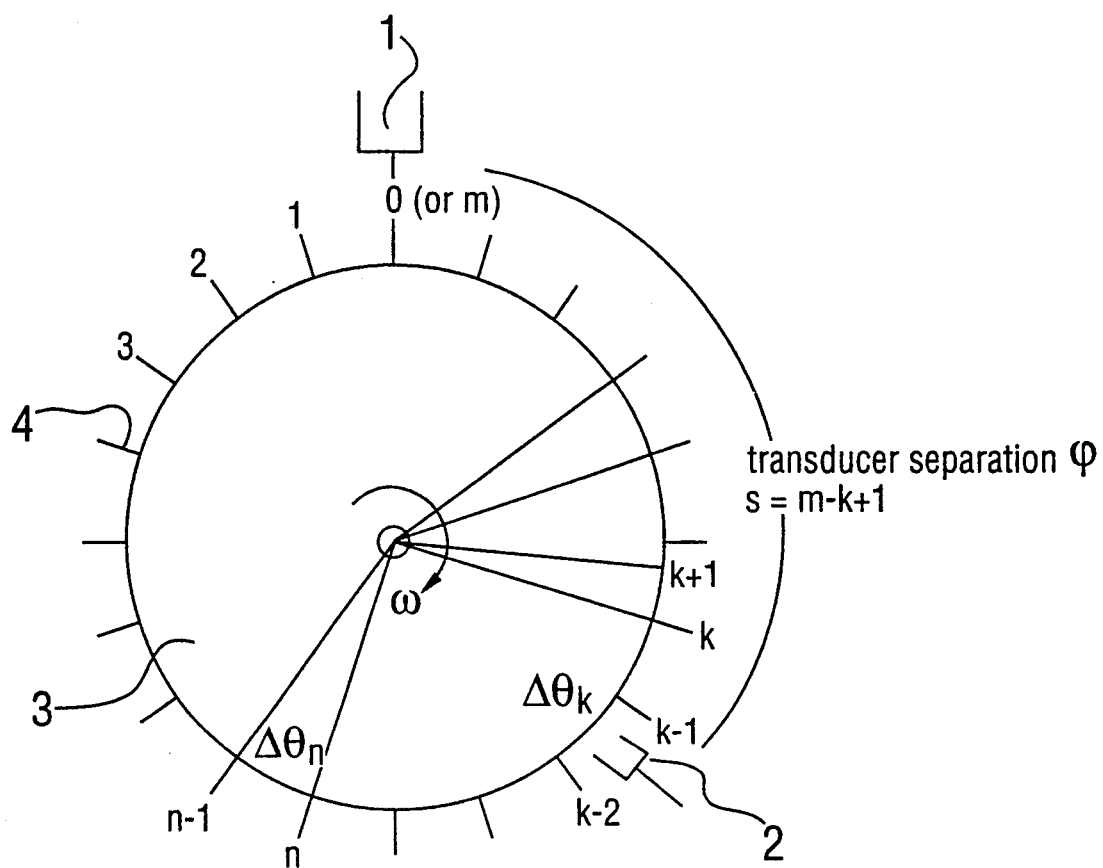
FIG. 1 is a diagrammatic illustration of an engine fly wheel and associated markers (gear teeth)

Referring now to FIG. 1, an engine fly wheel 3 rotating at angular velocity $\omega$ has a number m of gear teeth 4, numbered 1, 2, 3, ... m, disposed about its circumference. In an ideal engine, the gear teeth 4 would be equally spaced and rectangular in cross-section, but in practice the spacing may vary and the cross-section is not rectangular. For any given gear tooth n, $\Delta\theta_n$ is the angle between the $n^{th}$ and the n-$1^{th}$ tooth. The spacing may vary not only in the circumferential direction, but also in the axial direction, i.e. out of the plane of the drawings.

The passage of the gear teeth 4 is sensed by two radially disposed sensors 1, 2 mounted in the fly wheel housing (or suitable moutning bracket) and spaced apart by an overall angular distance $\phi$. The sensors 1, 2 are conveniently Hall effect devices producing a train of output pulses (FIG. 2) corresponding to the passage of the gear teeth. The pulses generated by the Hall effect sensors 1, 2, can be squared with suitable pulse shaping apparatus (not shown). If the gear teeth 4 were perfectly square and evenly spaced, the two pulse trains 5, 6 produced by the respective sensor 1, 2 would be equally matched, perfectly uniform and offset by a distance $\delta$ corresponding to the angular offset of the sensors relative to each other in relation to a point on the gear teeth. This offset $\delta$ results from the fact that when the leading edge of one tooth arrives at the first sensor 1, even in an ideal engine where the gear tooth spacing is equal it does not necessarily follow that the leading edge of a gear tooth will be arriving at the same position relative to sensor 2. The angular difference between the respective points on the gear teeth relative to the sensors is the offset $\delta$.

In reality the gear tooth spacing $\Delta\theta_n$ is not constant, but varies from tooth to tooth. The teeth themselves can be chipped and have odd shapes, which causes the leading and trailing edges of the pulses output by the sensors to occur at relatively different times, and furthermore the spacing of the teeth can vary in the axial direction. If the fly wheel is not absolutely plane, the two sensors will view parts of the fly wheel periphery that are offset relative to each other in the axial direction.

In accordance with the invention, angular velocity measurements are derived from the two sensors on the basis of initial assumptions which are then varied in an attempt to match the results derived from the two sensors. Through an iterative process a good estimate of the actual instantaneous angular velocity of the shaft can be made.

Referring again to FIG. 1, the fly wheel rotates in a clockwise direction and has m teeth numbered from 1 to m, tooth m representing a complete cycle and corresponding to tooth 0. The fly wheel rotates with an angular velocity $\omega$. The teeth are assumed to have a spacing $\Delta\theta$, which represents a set of values representing the angular spacing between the gear teeth. $\Delta\theta_n$ represents the spacing between the tooth n and tooth n-1.

The time duration, $\Delta t_{1,n}$ is the spacing in time between a similar point, normally the leading edge, on the pulses produced by the $n^{th}$ tooth and the n$-1^{th}$ tooth, as measured by transducer 1.

For a two-stroke engine, the set of pulses produced by the transducer 1 is represented by the set:

$$\Delta T_1 = (\Delta t_{11}, \Delta t_{12}, \Delta t_{13} \ldots \Delta t_{1m}).$$

The fly wheel gear teeth passing a transducer over one engine cycle are labelled 0 to m, with the time t=0 being taken to be the time when the 0 tooth triggers sensor 1.

At any point in time, the total time t since the $0^{th}$ tooth triggered the first sensor 1 is given by the expression:

$$t_{1n} = \sum_{i=1}^{i=n} \Delta t_{1i}$$

If the sensors 1, 2 were mounted in the same positions relative to the gear teeth, they would be triggered at the same time (assuming equal spacing). In fact, there is an offset $\delta t$, which represents the time between the triggering of sensor 1 by a given tooth and the time of triggering of sensor 2 due to the fact that the two sensors are not located necessarily in the same relative positions in relation to the teeth.

The time when the n tooth triggers transducer 2 is therefore given by the expression:

$$t_{2n} = \delta t + \sum_{i=k}^{i=n} \Delta t_{2i} \text{ for } k \leq n \leq m$$

$$t_{2n} = \delta t + \sum_{i=k}^{i=n} \Delta t_{2i} + \sum_{i=1}^{i=m} \Delta t_{2i} \text{ for } 1 \leq n \leq k$$

The gear teeth spacing are defined by the set $$\Delta\theta = (\Delta\theta_1, \Delta\theta_2, \Delta\theta_3 \ldots \Delta\theta_m)$$

where $\Delta\theta_n$ is the unknown gear tooth spacing between the n$-1$ tooth and the n tooth.

From FIG. 1, it can be seen that the $k^{th}$ element in the set $\Delta\theta$ corresponds to the $1^{st}$ element in the set $\Delta T_2$ for transducer 2.

At time $t=t_{1n}$, the fly wheel as measured at sensor 1 has moved through an angular displacement relative to its position at time $t_0$ given by the expression:

$$\theta_{1n} = \sum_{i=1}^{i=n} \Delta\theta_i \text{ for } 1 \leq n \leq m$$

This leads to the set of angular displacements $$\theta_1 = (\theta_{11}, \theta_{12}, \theta_{13}, \ldots \theta_{1m})$$

where $\theta_{11}, \theta_{12}$, etc. represent the angular spacings of the teeth 1, 2, 3 ... m, that pass sensor 1.

Similarly for transducer 2, the angular displacement of the fly wheel at time $t=t_{2n}$ can be represented by $$\theta_{2n} = \delta\theta + \sum_{i=k}^{i=n} \Delta\theta_{2i} \text{ for } k \leq n \leq m$$

-continued $$\theta_{2n} = \delta\theta + \sum_{i=k}^{i=n} \Delta\theta_{2i} + \sum_{i=1}^{i=m} \Delta\theta_{2i} \text{ for } 1 \leq n \leq k$$

Consequently a similar set $\theta_2$ can be written for sensor 2 as follows:

$$\theta_2 = (\theta_{21}, \theta_{22}, \theta_{23} \ldots \theta_{2m})$$

The angular velocity as measured at each gear tooth for sensor 1 can be therefore written as a set $$\Omega_1 = (\omega_{11}, \omega_{12}, \omega_{13} \ldots \omega_{1m})$$

where $\omega_1$ is ideally the instantaneous velocity at time $t = t_{1n}$, and similarly for sensor 2 a set can be written as:

$$\Omega_2 = (107_{21}, \omega_{22}, \omega_{23} \ldots \omega_{2m})$$

The angular velocity measured by sensor 1 at any instant must be identical to the angular velocity as measured by sensor 2 i.e.

$$\Omega_1(t) = \Omega_2(t)$$

In performing the method according to the invention, the following steps are performed:

1. An initial estimate of set $\Delta\theta$ is made on startup on the assumption that the gear teeth are of uniform width and equal spacing. The initial estimate is given by a first approximation as $$\Delta\theta_n = 2\pi/m$$

2. On the basis of the estimated $\Delta\theta_n$, a first estimate of $\Omega_1$ and $\Omega_2$ can be calculated from $\theta_1$, $\theta_2$ and the measured time counts $\Delta T_1$ and $\Delta T_2$.

3. Since $\Omega_1(t)$ and $\Omega_2(t)$ must be identical, any differences are attributed to errors in the current estimate for $\Delta\theta_1$. By examining $\Omega_1$ and $\Omega_2$, any large deviations in the velocity can be eliminated. A large deviation may be due to gear tooth spacing error. Such deviations or spikes would occur at different positions in $\Omega_1$ and $\Omega_2$. By replacing the deviant $n^{th}$ element of $\Omega_1$ ($\omega_{1n}$) with the $\lambda^{th}$ element of $\Omega_2$ ($\omega_{2r}$ where $r = n + k - 1$ modulo m), $\Omega_1$ can be made to more accurately represent the true ICAV waveform.

4. The new estimate for $\Omega_1$ can be used to determine a new estimate for $\theta_1$ and thus $\Delta\theta$. From the new gear tooth distribution $\Delta\theta$, $\Omega_1$ and $\Omega_2$ can be recalculated.

5. Although the two sensors 1, 2 measure the same ICAV waveform, the elements of their respective data sets $\Delta T_1$ and $\Delta T_2$ do not correspond to identical times, and in reality the elements of $\Omega_1$ and $\Omega_2$ are not expected to be exactly the same. To converge on the true ICAV waveform, $\Omega_2$ can be modified such that its elements represent the angular velocity at the same discrete times as the corresponding elements in $\Omega_1$ by using a suitable interpolation method.

A new estimate of the ICAV waveform, $\Omega_1'$, can be made using $$\Omega_1' = \Omega_1 + \alpha(\Omega_2 - \Omega_1)$$

where $\alpha$ is a weighting factor that allows account to be taken of the confidence in the two sets of data, and may be $\frac{1}{2}$, in which case $\Omega'$ becomes the arithmetic average of $\Omega_1$ and $\Omega_2$. This is done when neither $\Omega_1$ nor $\Omega_2$ can be said to be more accurate than the other.

The above Steps 4-5 are repeated until the solution converges to some specified tolerance. At that point it is expected that the current estimate will be close to the actual gear tooth spacing configuration, and that $\Omega_1$ and $\Omega_2$ will be near each other and near the true angular velocity.

For a four stroke engine, the flywheel completes two revolutions for each combustion cycle. For a flywheel with m teeth, the sets $\Delta T_1$, $\Delta T_2$, $\theta_1$ and $\theta_2$ will have 2 m elements. However, the $\Delta\theta$ set will still only have m unique elements.

The additional constraint imposed for a four-stroke engine is that the gear tooth spacing does not change within an engine cycle. In mathematical terms, this may be expressed as:

$$\Delta\theta_n = \Delta\theta_{n-m} \text{ for } m+1 \leq n \leq 2m$$

The algorithm presented for two-stroke engines can be applied to four stroke engines with only a few modifications. The most significant change is that in calculating a new $\Delta\theta$ set (step 4) from $\theta_1$, the constraint is that there are only m independent gear tooth spacings. One way to do this in step 4 is to average the two estimates available for each element in the $\Delta\theta$ set from the $\theta_1$ set before computing $\Omega_1$ and $\Omega_2$.

Figure 3:
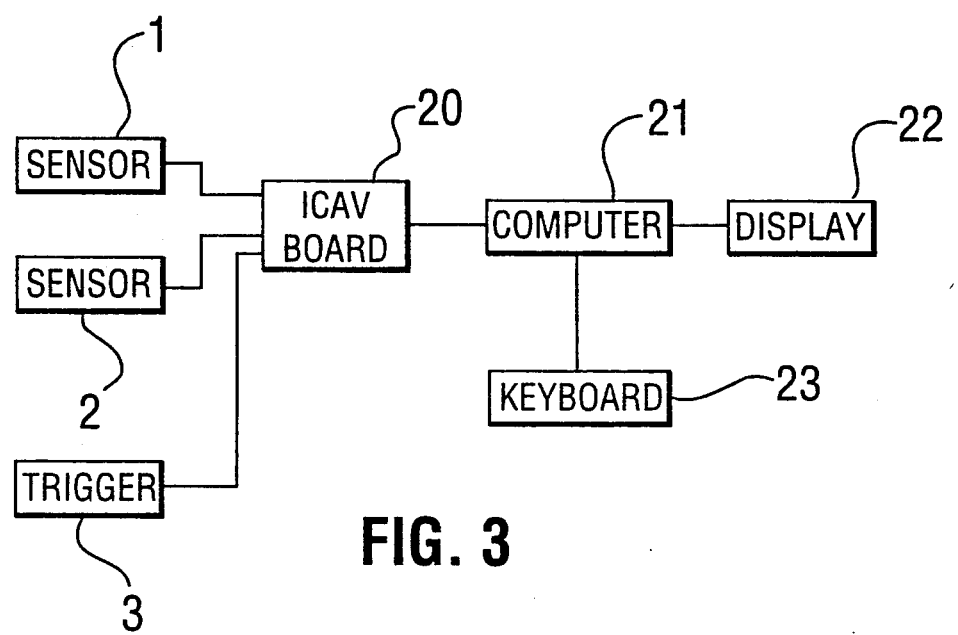
FIG. 3 is an overall block diagram of an apparatus for measuring the instantaneous crank shaft velocity in accordance with one embodiment of the invention.

FIG. 3 shows the hardware configuration of the apparatus for implementing the above described procedure. Hall effect sensors 1, 2 are connected to an ICAV board 20 (described in more detail below) inserted in an expansion slot of an IBM AT compatible computer 21 having a keyboard 22 and display 23 on which the ICAV waveform can be viewed.

Figure 4:
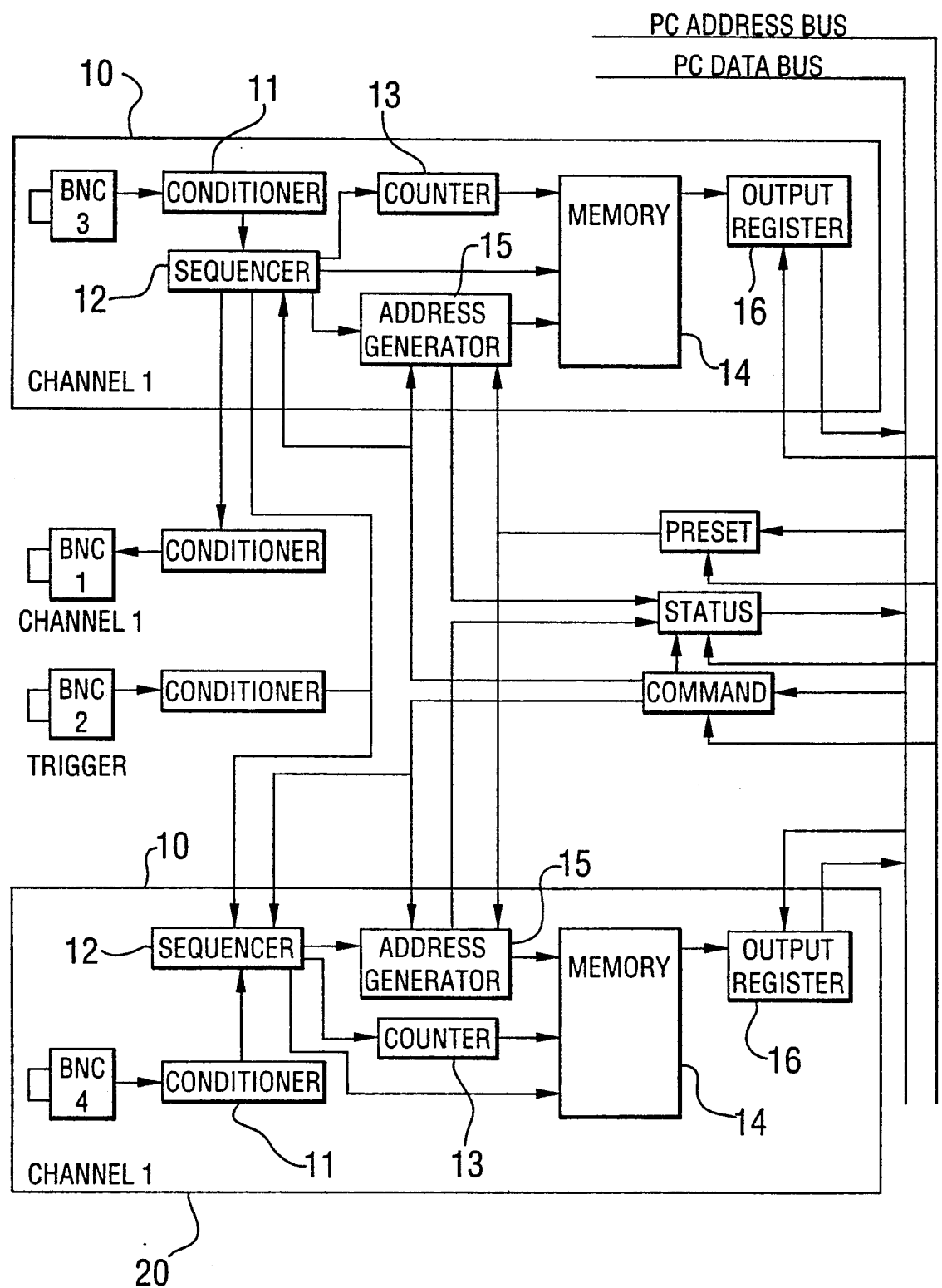
FIG. 4 is a more detailed block diagram of an apparatus for deriving timing signals for use in determining the ICAV waveform.

As shown in more detail in FIG. 4, to receive the Hall effect sensor signals the custom printed circuit board 20 is employed. This board, called an ICAV Board, fits into an AT style IBM PC or compatible computer. The base address of this board can be set by way of a board mounted DIP switch. Signals are transferred to and from the ICAV Board via 4 BNC connectors.

The purpose of the ICAV Board is to measure the time interval between successive passage of teeth on a gear past a sensor. Its main characteristics can be listed as follows:

input/output connections are through 4 BNC jacks
3 input channels (1 channel is a trigger input)
1 output channel
total of 128 KB of on board memory
fits into IBM AT slot
control of board is by way of seven registers Each ICAV Board channel 10, 10 can be divided into six functional blocks, namely a signal condition block 11, a sequencer Block 12, a counter block 13, a memory block 14, a memory address generator block 15, and an output register block 16. The function of each block will now be described in more detail below.

The task of the signal condition block 11 is two fold: a) to render the input signals usable by the logic circuits of the ICAV Board, and b) to provide sufficient drive for the output signal.

Figure 2:
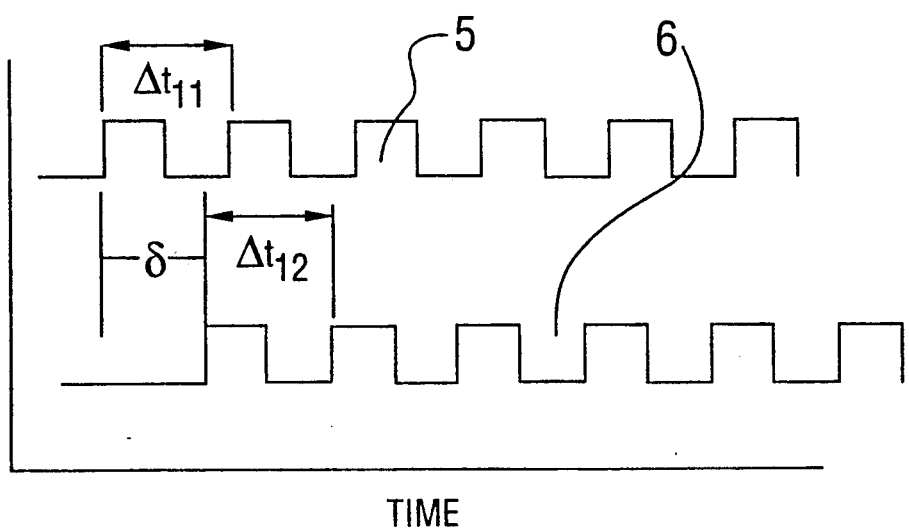
FIG. 2 is a chart showing the output waveforms from the two circumferentially spaced sensors mounted around the fly wheel.

The input conditioner 11 comprises filters in the form of capacitors to despike the pulses from the Hall-effect sensors. A Schmidt trigger compensates for the slowly rising Hall effect signal and generates a square waveform as shown in FIG. 2.

The sequencer block 12 coordinates the onboard events according to commands from the host computer and the input signals. The sequencer 12 can start and stop counter 13 that performs the actual time measurement.

The counter block 13 is a 16-Bit counter, which measures the time between two rising edges of gear teeth that pass a Hall effect sensor.

The memory block 14 permits the ICAV board to store up to 32,768 16-Bit data samples per channel.

The memory address generator Block 15 specifies the memory locations at which the read/write operations take effect. There is an address generator for each channel 10. During a data acquisition cycle, the sequencer 12 controls the address generators 15, incrementing them after each gear tooth interval is stored, until the memory is full.

The output register block 16 is used to transfer gear teeth spacing information from the ICAV board's memory to a host computer.

In a data acquisition cycle, once the board is initialized for data acquisition, events on both channels follow sequential operations, resulting in the storage of timing measurements.

In the Stand-By State, which is reached automatically when the board's memory becomes full, the ICAV Board is idle. Data can be read from the board and commands issued during this period. The Data Acquisition state is engaged only after having received the appropriate series of commands from the host computer.

The operation of the ICAV board will now be described:

In order to measure the time interval between teeth on a gear, at the start of each gear tooth interval, certain actions are executed by the sequencer functional block 12 as discrete microcycles. The sequencer 12 is a synchronous state machine, driven by the system 40 MHz clock. The counter 13 is used to actually measure the time between the gear teeth and is a 16-bit hardware counter clocked at the same 40 MHz rate.

In steady state acquisition operation, 17 microcycles of overhead are used up by the sequencer 12 for each gear tooth interval measured. The first sample, however, is the time from the TDC marker to the first gear tooth, and is the only exception, where only 3 microcycles are needed. The sequencer overhead, therefore, must be added to the sample values of the measured gear tooth time intervals.

The functions performed by the microcycles of the sequencer 12 for each gear tooth interval, can be described as follows:
 stop the counter
 store the count value in the memory at the current location
 clear (or reset) the counter
 start the counter
 increment the memory location for next sample.

The software interaction with the ICAV board is by way of 7 registers: 3 of the registers are used to write/-read control information to/from the board, while the other 4 registers are used to read the data acquired by the board.

The three control registers can be described as follows:
 Command register. This is used to initiate an acquisition cycle, or control the reading back of acquired data. When reading data back into the computer's memory, bits in this register are used to reset and increment the Address Generators.
 Status register. This is used to check the current state of the board: The end of an acquisition cycle may be determined by polling this register.
 Preset register. This is used to limit the number of samples taken during an acquisition cycle to a multiple of 4096.

The 4 data registers correspond to the upper and lower 8-bit bytes of the 16-bit samples taken on each of the two channels.

The following is a description of the algorithm of a typical acquisition and read-back cycle:

First, the number of samples to be taken is chosen and the corresponding value written to the preset register. The address generators are then initialized by a series of appropriate commands to the command register. Last, the acquisition cycle is engaged by writing another single command to the command register. The end of the acquisition cycle is then determined by polling the status register.

The acquired data is then read back four bytes at a time, one from each of the data registers (two bytes at a time if data was acquired on only one channel). The upper and lower 8-bits of a 16-bit data sample must be reassembled in software and the sequencer overhead added. After each sample has been read, the address generators are incremented by writing the appropriate commands to the command register.

The board 20 in effect outputs through registers 16 the data sets $\Delta T_1$ and $\Delta T_2$ as shown in FIG. 2. By operating in the manner described above on the data sets $\Delta T_1$ and $\Delta T_2$ in the computer 20 (FIG. 3), the ICAV waveform can be derived.

The apparatus described, by compensating for unequal gear tooth spacing in accordance with the above described correction procedure, achieves improved resolution of ICAV measurements and consequently permits earlier detection of power imbalances in rotary engines, such as multicylinder diesel engines, than is possible with existing techniques.

The waveforms shown in FIGS. 5 and 6 relate to a Detroit Diesel Corp. two-stroke, six cylinder, turbocharged model 6V92T, direct injection diesel engine. This engine has electronically controlled unit injectors so that the amount of fuel to any cylinder can be increased or decreased. At the baseline condition of 1200 rpm and 75% power (FIG. 5), the fuel quantity to cylinder no. 2(R) was reduced such that the peak combustion pressure was decreased nominally by 5% and 10% as shown in FIG. 6. FIG. 5 indicates that a 5% peak combustion pressure reduction has relatively little impact on the ICAV waveform, but a significant change in the ICAV waveform occurs at a 10% reduction in peak pressure of cylinder 2(R).

The ICAV waveforms shown in FIG. 5, can be compared with standard ICAV waveforms using pattern recognition systems to give early warning of possible fault conditions. The ICAV results can be combined with signals from other sensors in the engine to enable a comprehensive engine health or condition monitoring system to be developed.

The embodiments of the invention in which an exclusive property or privilege is claimed are defined as follows:

1. An apparatus for measuring the instantaneous shaft velocity of a rotary machine having a shaft with plurality means thereon defining circumferentially spaced markers, comprising:

at least two circumferentially spaced sensors for mounting adjacent the shaft to sense the passage of said markers and generate a stream of pulses in response thereto;

for each of said sensors, means for continually generating a set of timing signals from said pulses, said timing signals representing a set of timing measurements corresponding to the passage of n respective successive markers past said sensors, a memory for storing said set of timing signals, and means for generating signals representing a set of estimated marker spacings for said n successive markers; and processor means for deriving for each pair of corresponding timing and spacing signals a signal representing the instantaneous angular shaft velocity, said processor means varying the signals representing the estimated spacings of said markers on an iterative basis to attempt to make the angular velocity signals derived from the respective sensors the same; and output means for generating a waveform representing the instantaneous shaft angular velocity from said angular velocity signals derived from the respective sensors.

2. An apparatus as claimed in claim 1, wherein said output means averages the angular velocity signals associated with the respective sensors.

3. An apparatus as claimed in claim 1, wherein said marker means comprise gear teeth on a flywheel of said machine.

4. An apparatus as claimed in claim 1, wherein said sensors are Hall-effect sensors.

5. An apparatus for measuring the instantaneous shaft velocity of a rotary machine having a shaft with plurality means thereon defining circumferentially spaced markers, comprising:

at least two circumferentially spaced sensors for mounting adjacent the shaft to sense the passage of said markers and generate a stream of pulses in response thereto;

for each of said sensors, a processing channel comprising a conditioner for conditioning said pulses, a counter for measuring the time intervals between said pulses, a memory for storing a set of measured time intervals ($\Delta T_{1,2}$), an address generator for specifying the location of said set of stored measured time intervals in said memory, and an output register for outputting the stored set of measured time intervals ($\Delta T_{1,2}$);

a data bus connected to said output register of each said processing channel; and a central processor connected to said data bus for generating signals representing a set of estimated spacings of said successive markers and associating said estimated spacings with corresponding stored measured time intervals, said central processor further deriving for each pair of corresponding timing and spacing signals a signal representing the instantaneous angular shaft velocity, and said central processor varying the signals representing the estimated spacings of said markers on an iterative basis to attempt to make the angular velocity signals derived from the respective sensors the same; and output means for generating a waveform representing the instaneous shaft angular velocity from said angular velocity signals derived from the respective sensors.

6. An apparatus as defined in claim 5, wherein said output means averages the angular velocity signals derived from the respective sensors to generate therefrom an instantaneous shaft velocity waveform, and a further comprising a visual display device for displaying said waveform.

7. A method of measuring the instantaneous shaft velocity of a rotary machine having a shaft with a plurality of means thereon defining circumferentially spaced markers, comprising:

sensing the passageway of said markers with at least two circumferentially spaced sensors mounted adjacent the shaft to generate a stream of pulses in response to the passage of said markers thereby;

for each of said sensors, continually generating timing signals representing a set of timing measurements corresponding to the passage of n successive markers thereby, storing said timing signals in a memory, and generating signals representing a set of estimated spacings for said n respective successive markers, for each pair of corresponding timing and spacing signals deriving a signal representing the instantaneous angular shaft velocity;

varying the signals representing the estimated spacings of said markers on an iterative basis to attempt to make the angular velocity signals derived from the respective sensors the same; and generating from said angular velocity signals derived from the respective sensors an output waveform corresponding to the instantaneous shaft angular velocity.

8. A method as claimed in claim 7, wherein the output waveform represents an average of the angular velocity signals derived from the respective sensors.

9. A method as claimed in claim 8, wherein for each sensor the estimated spacings of the markers that have passed the sensors since a time $t_0$ are represented by respective sets $\theta_1, \theta_2, \ldots \theta_n$, and the signal representing the instantaneous angular shaft velocity is derived from said sets and the time elapsed since a starting time $t_0$.

10. A method as claimed in claim 7 wherein said waveform is displayed on a visual display device.

* * * * *